United States Patent
Ilicic

(10) Patent No.: US 10,935,358 B2
(45) Date of Patent: Mar. 2, 2021

(54) PIPE FLANGE IDENTIFICATION TOOL AND SYSTEM

(71) Applicant: Promet Valves Australia Pty Ltd, Woodville West (AU)

(72) Inventor: Zeljko Ilicic, Woodville West (AU)

(73) Assignee: PROMET VALVES AUSTRALIA PTY LTD, Woodville West (AU)

( * ) Notice: Subject to any disclaimer, the term of this patent is extended or adjusted under 35 U.S.C. 154(b) by 212 days.

(21) Appl. No.: 16/112,530

(22) Filed: Aug. 24, 2018

(65) Prior Publication Data

US 2019/0186887 A1 Jun. 20, 2019

(30) Foreign Application Priority Data

Dec. 15, 2017 (AU) .................................. 2017905023

(51) Int. Cl.
- *G01B 3/34* (2006.01)
- *F16L 23/00* (2006.01)
- *G01B 5/08* (2006.01)

(52) U.S. Cl.
CPC .............. *G01B 3/34* (2013.01); *F16L 23/003* (2013.01); *G01B 5/08* (2013.01); *F16L 2201/60* (2013.01)

(58) Field of Classification Search
CPC ............... G01B 3/34; G01B 3/06; G01B 5/08
USPC ................... 33/55.2, 501.08, 555.2
See application file for complete search history.

(56) References Cited

U.S. PATENT DOCUMENTS

| | | | | |
|---|---|---|---|---|
| 2,736,286 A | * | 2/1956 | Britton | B23K 37/0536 269/48.1 |
| 4,517,747 A | * | 5/1985 | Morin | A61B 3/107 33/512 |
| 5,392,524 A | * | 2/1995 | Hill | E03C 1/021 33/412 |
| 5,617,644 A | * | 4/1997 | Bonelli | A24F 47/00 33/548 |
| 6,070,336 A | * | 6/2000 | Rodgers | G01C 9/28 33/370 |
| 6,077,000 A | * | 6/2000 | Gibbons | B23B 47/28 33/529 |
| 7,040,034 B2 | * | 5/2006 | Nielson | B25H 7/00 33/574 |
| 8,151,479 B1 | * | 4/2012 | Carnegie | G01B 3/38 33/548 |

(Continued)

FOREIGN PATENT DOCUMENTS

| | | |
|---|---|---|
| DE | 29713507 U1 | 9/1997 |
| EP | 1348815 A1 | 10/2003 |

(Continued)

OTHER PUBLICATIONS

European Search Report dated Jan. 16, 2019, issued in corresponding European Application No. 18186895, filed Aug. 1, 2018, 2 pages.

*Primary Examiner* — Christopher W Fulton
(74) *Attorney, Agent, or Firm* — Christensen O'Connor Johnson Kindness PLLC

(57) ABSTRACT

The present disclosure relates to a pipe flange standard identification tool and a system. In one aspect, the valve identification tool includes a pair of spaced-apart apertures and bears information identifying a valve having a pair of adjacent flange bolts with a spacing therebetween, which matches the spacing between the apertures. Also disclosed is a set of the above-described valve measurement tools, and a kit having a plurality of the tool sets. In one form, each of the tools in a given set corresponds with a valve listed in a common standard.

22 Claims, 1 Drawing Sheet

(56) References Cited

U.S. PATENT DOCUMENTS

| | | | | |
|---|---|---|---|---|
| 8,973,281 | B1* | 3/2015 | Fiquette | G01B 3/002 |
| | | | | 33/671 |
| 2002/0100180 | A1* | 8/2002 | Montefusco | B43L 13/205 |
| | | | | 33/563 |
| 2003/0131489 | A1* | 7/2003 | Hsiao | G01B 3/34 |
| | | | | 33/555.2 |
| 2005/0160611 | A1* | 7/2005 | Nave | G01B 3/42 |
| | | | | 33/501.45 |
| 2016/0377421 | A1* | 12/2016 | Flaucher | B23K 37/0531 |
| | | | | 356/400 |

FOREIGN PATENT DOCUMENTS

| | | | |
|---|---|---|---|
| FR | 2926868 | A1 | 7/2009 |
| FR | 3017922 | A1 | 8/2015 |

\* cited by examiner

PIPE FLANGE IDENTIFICATION TOOL AND SYSTEM

CROSS-REFERENCE TO RELATED APPLICATION

This application claims the benefit of Australian Provisional Patent Application No. 2017905023, filed Dec. 15, 2017, the disclosure of which is hereby expressly incorporated by reference herein in its entirety.

BACKGROUND

The present disclosure relates to a pipe flange standard identification tool and a system. A variety of valves are used in the piping and machinery systems of a ship or a building, for controlling and regulating fluid flow therethrough.

There are many different types of valves, and these come in many different sizes. Moreover, there are numerous different standards for valves in piping systems, including, but not limited to AS, JIS, ANSI, and DIN.

In most cases, proper identification of a valve for replacement purposes requires measuring one or more of a face to face length, a flange diameter or a pitch circle diameter (PCD) of the valve flange, and then checking the catalogues for a listing of a valve with these dimensions in order to identify the relevant standard.

However, the act of accurately measuring a given valve using a conventional measuring implement such as calipers, can be made difficult by the position of the valve, which may be up high, down low, in a confined space and/or otherwise obstructed.

All of these factors can make correctly identifying a given valve quite difficult. Embodiments of the present disclosure are directed to fulfilling these and other needs.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

According to a first aspect of the present invention, there is provided a pipe flange identification tool comprising a pair of spaced apart apertures and bearing information identifying a pipe flange comprising a pair of adjacent flange bolts with a spacing therebetween which matches the spacing between the apertures.

In one form, the flange is part of a valve, and the tool bears information identifying a valve comprising the pipe flange.

According to a further aspect, there is provided a valve identification tool comprising a pair of spaced apart apertures and bearing information identifying a valve comprising a pair of adjacent flange bolts with a spacing therebetween which matches the spacing between the apertures.

In one form, each of the apertures is sized to the diameter of the holes specified in the relevant standard, thus allowing the apertures to receive a threaded portion of each of the pair of adjacent flange bolts.

In one form, the tool comprises a body comprising a head portion which comprises the pair of apertures, and a handle portion.

In one form, the body of the tool is elongate.

In one form, the head portion is at or toward a first end of the body, and the handle portion is at or toward a second end of the body.

In one form, each of the apertures is a through aperture.

In one form, in an alternative, each of the apertures is a blind aperture.

In one form, the body comprises a lamina.

In one form, the lamina is formed from a semi rigid material. That is to say, the material is a somewhat flexible material.

In one form, each of the apertures is positioned adjacent to an edge of the lamina.

In one form, the body of the tool comprises a recess between the apertures.

In one form, the recess is formed into the portion of the edge of the lamina extending between the apertures.

Where provided, the purpose of this recess is to provide clearance around the valve body or pipe. It is not required for all tools.

In one form, the identifying information on the tool comprises information about the relevant standard for the flange and/or valve.

In one form, the identifying information on the tool comprises the DN number of the flange and/or valve.

In one form, the identifying information on the tool comprises the NPS number of the flange and/or valve.

The size of pipes, fittings, flanges and valves are often given in inches as NPS—Nominal Pipe Size, or in metric units as DN—'Diametre Nominal'.

In one form, the identifying information on the tool comprises the Pitch Circle Diameter (PCD) of the bolt pattern on the flange.

In one form, the identifying information on the tool comprises the diameter of the bolt holes.

In one form, the identifying information on the tool comprises the number of bolt holes in the bolt pattern on the flange.

With all of this information provided on the tool, there is no need to check flange catalogues to determine the relevant standard.

According to a further aspect, there is provided a set of the above-described valve measurement tools.

In one form, each of the tools in a set is tethered together.

In one form, each of the tools comprises a hole for a tether, through which the tether is passed.

In one form, each of the tools in the set corresponds with a valve listed in a common standard. That is to say, each of the tools in a given set relates to the same standard.

According to a further aspect, there is provided a kit comprising a plurality of the tool sets.

In one form, each of the sets corresponds with a common standard. That is to say, there is a first set for a first standard, a second set for a second standard, and so on.

In one form, the kit comprises a case for all of the sets of tools.

According to a further aspect, there is provided a pipe flange identification tool comprising a pair of spaced apart apertures and identifying a pitch circle diameter (PCD) comprising adjacent flange bolts with a spacing therebetween which matches the spacing between the apertures.

DESCRIPTION OF THE DRAWINGS

The foregoing aspects and many of the attendant advantages of the present disclosure will become more readily appreciated as the same become better understood by reference to the following detailed description, when taken in conjunction with the accompanying drawings, wherein.

DETAILED DESCRIPTION

The detailed description set forth below in connection with the appended drawings, where like numerals reference like elements, are intended as a description of various embodiments of the present disclosure and are not intended to represent the only embodiments. Each embodiment described in this disclosure is provided merely as an example or illustration and should not be construed as precluding other embodiments. The illustrative examples provided herein are not intended to be exhaustive or to limit the disclosure to the precise forms disclosed.

In the following description, specific details are set forth to provide a thorough understanding of exemplary embodiments of the present disclosure. It will be apparent to one skilled in the art, however, that the embodiments disclosed herein may be practiced without embodying all of the specific details. In some instances, well-known process steps have not been described in detail in order not to unnecessarily obscure various aspects of the present disclosure. Further, it will be appreciated that embodiments of the present disclosure may employ any combination of features described herein.

The present application may include references to directions, such as "forward," "rearward," "front," "rear," "upward," "downward," "top," "bottom," "right hand," "left hand," "lateral," "medial," "in," "out," "extended," etc. These references, and other similar references in the present application, are only to assist in helping describe and to understand the particular embodiment and are not intended to limit the present disclosure to these directions or locations.

The present application may also reference quantities and numbers. Unless specifically stated, such quantities and numbers are not to be considered restrictive, but exemplary of the possible quantities or numbers associated with the present application. Also in this regard, the present application may use the term "plurality" to reference a quantity or number. In this regard, the term "plurality" is meant to be any number that is more than one, for example, two, three, four, five, etc. The terms "about," "approximately," "near," etc., mean plus or minus 5% of the stated value. For the purposes of the present disclosure, lists of two or more elements of the form, for example, "at least one of A, B, and C," is intended to mean (A), (B), (C), (A and B), (A and C), (B and C), or (A, B, and C), and further includes all similar permutations when any other quantity of elements is listed.

Figure 1:
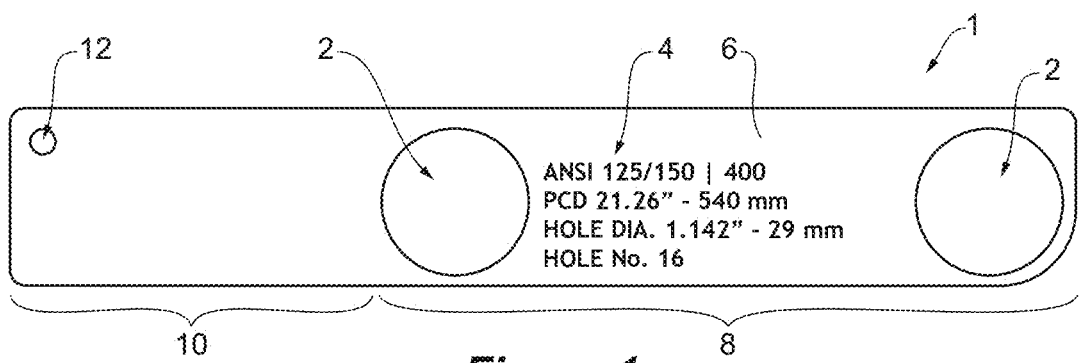
FIG. 1 is a plan view of one representative embodiment of a first pipe flange identification tool in accordance with an aspect of the present disclosure.
Figure 2:
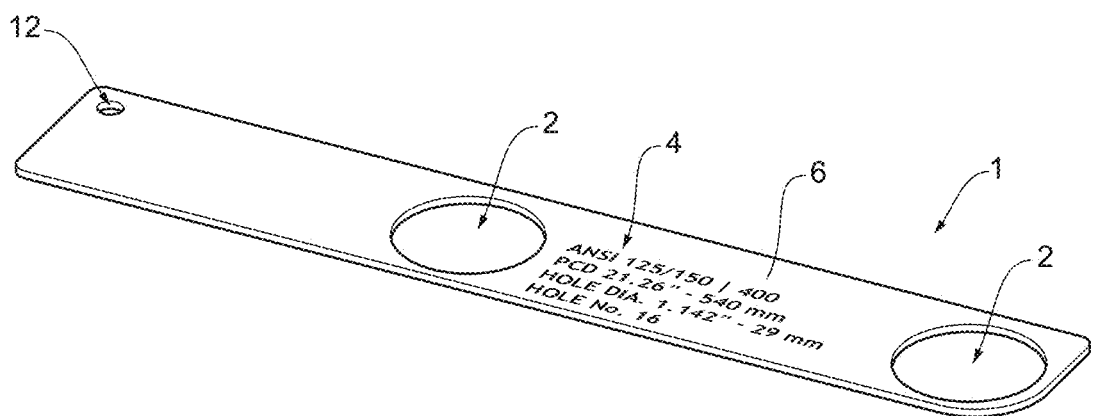
FIG. 2 is an isometric view of the pipe flange identification tool of FIG. 1.

The following description provides several examples that relate to a pipe flange standard identification tool and a system. Referring now to FIGS. 1 and 2, there is shown a pipe flange identification tool 1 comprising a pair of apertures 2 and bearing information 4 identifying a valve with a flange comprising a pair of adjacent flange bolts with a spacing therebetween which matches the distance between the apertures 2.

In some embodiments, each of the apertures 2 is a through aperture sized to receive a threaded portion of a bolt of each of the pair of adjacent flange bolts of the valve identified thereby. The term adjacent bolts, used herein, is meant as a first bolt on the flange, and the next bolt circumferentially around the flange in either direction.

Illustrated embodiments of the tool 1 generally include a body 6 having a lamina of a semi rigid material. In some embodiments, the material is flexible. In other embodiments, a plastic material or a thin metal strip is used for the lamina of the body 6.

In some embodiments, the body 6 of the tool 1 is elongate, and generally rectilinear in plan view. The body 6 of the tool 1 generally includes a head portion 8 and a handle portion 10, via which the tool 1 will be handled. In these embodiments, the apertures 2 are offset towards the head portion 8. The thin elongate body of the tool is generally configured to be well suited for positioning into small spaces.

In some embodiments, each of the apertures 2 is positioned adjacent to an edge of the lamina.

In some embodiments, the identifying information 4 on the tool 1 includes information about the relevant standard. In these embodiments, the identifying information 4 is American Society for Testing and Materials (ANSI) 125/150. In other embodiments, the identifying information 4 on the tool 1 further includes information about the DN ('Diametre Nominal') number of the valve, e.g., "400," which indicates that the valve is for a pipe of 400 mm internal diameter.

In further embodiments, the identifying information 4 on the tool further lists the Pitch Circle Diameter (PCD) of the bolt pattern on the flange, the number of the bolt hole on the flange, and the hole diameter of the bolt holes in the flange.

Figure 3:
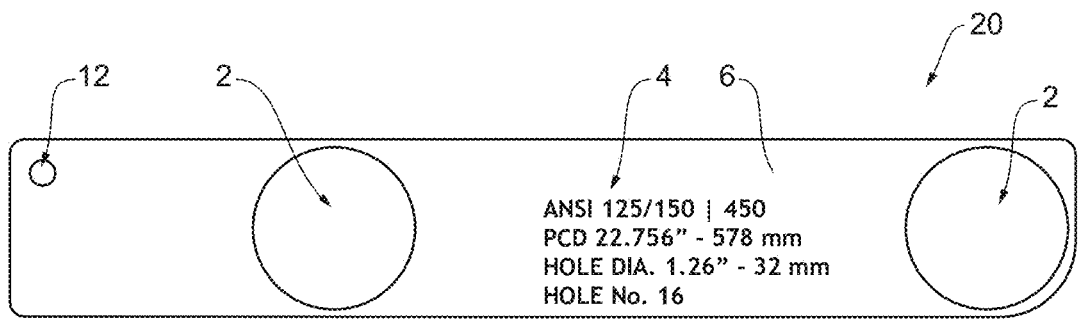
FIG. 3 is a plan view of one representative embodiment of a second pipe flange identification tool in accordance with another aspect of the present disclosure.

Referring now to FIG. 3, a second pipe flange identification tool 20 is shown. Those parts of the tool 20 which are substantially similar to corresponding parts shown in the tool 1 of FIG. 1, will be denoted by the same reference numerals and will not be described again in detail.

In the illustrated embodiment, apertures 2 of tool 20 are slightly further apart and slightly larger than the apertures 2 of tool 1. In an embodiment, the identifying information on tool 20 indicates that the apertures of tool 20 match a pair of adjacent bolts on a valve which complies with ANSI 125/150, with a DN of 450.

Figure 4:
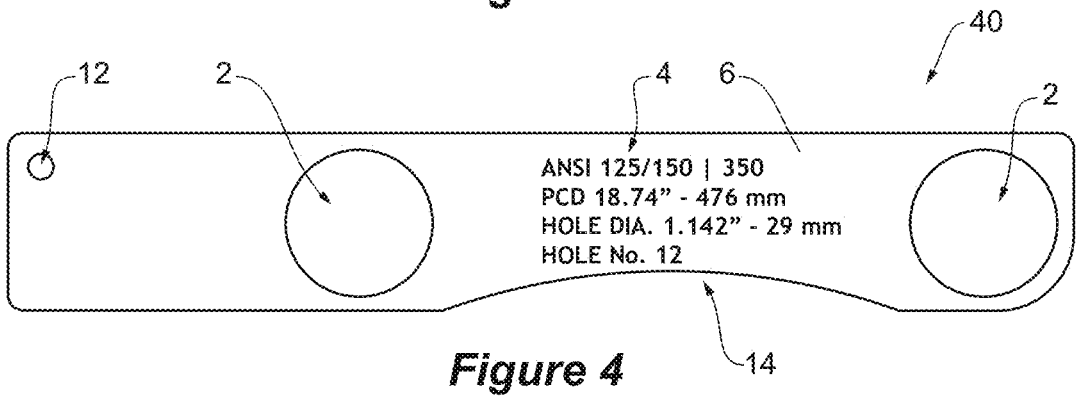
FIG. 4 is a plan view of one representative embodiment of a third pipe flange identification tool in accordance with another aspect of the present disclosure.

Referring now to FIG. 4, a third pipe flange identification tool 40 is shown. Those parts of the tool 40 which are substantially similar to corresponding parts shown in the tool 1 of FIG. 1, will be denoted by the same reference numerals and will not be described again in detail.

In the illustrated embodiment, apertures 2 of tool 40 are slightly further apart, but are similarly sized to the apertures 2 of tool 1. In an embodiment, the identifying information 4 on tool 40 indicates that the apertures of tool 40 match a pair of adjacent bolts on a valve which complies with ANSI 125/150, with a DN of 350.

Tool 40 further comprises a recess 14 formed into a portion of the edge of the lamina between the apertures 2. The purpose of this recess 14 is to provide clearance around the valve body or pipe. It is not required for all tools.

Some embodiments of the tools 1, 20, and 40 identify valves which comply with ANSI 125/150. In other embodiments, tools substantially similar to the tools 1, 20, and 40, shown and described herein, may be produced for each valve configuration listed in ANSI 125/150, and such tools may be configured to tether together by a tether passing through a hole 12 in the body 6, to create a set of ANSI 125/150 valve identification tools.

In other embodiments, further sets of tools are within the scope of the present disclosure, for example, tool sets made for other valve standards, including but not limited to American Petroleum Institute (API), American Society of Mechanical Engineers (ASME), Japanese Industrial Standard (JIS), American Society for Testing and Materials (ASTM), British Standard institute (BSi), International Organization for Standardization (ISO), Society of Automotive Engineers (SAE), Manufacturers Standardization Society (MSS), and Deutsches Institut für Normung (DIN) standards. Such tool sets are configured to be compiled into one or more kit, and are capable of storage in a common case.

In use, a given valve can be identified by seeking a tool whose apertures 2 have a spacing which both matches the spacing of a pair of adjacent bolts on a flange of the valve, and whose apertures 2 neatly fit over threaded portions of both of the bolts (i.e., the threaded bolt portions nest in the apertures 2, and are not clearly too small for the apertures). In some embodiments, the valve can then be identified by the information provided on the tool which matches its bolts. The tool correctly corresponding to the valve is found by test fitting tools against the flange bolts of the valve. This process can be performed quickly as the user becomes more experienced. An experienced user can generally make a first guess at a tool which will get them close to a match.

It should be understood that a tool of this type could find other uses. For example, a similar tool may be used to identify a Pitch Circle Diameter (PCD) of a wheel hub stud pattern, in order to identify wheels which would match the stud pattern.

Advantageously, the present invention allows a user to determine with accuracy the flange standard relevant to a flange connected to a pipe or valve without other measurement devices or disassembly of the flange.

The principles, representative embodiments, and modes of operation of the present disclosure have been described in the foregoing description. However, aspects of the present disclosure, which are intended to be protected, are not to be construed as limited to the particular embodiments disclosed. Further, the embodiments described herein are to be regarded as illustrative rather than restrictive. It will be appreciated that variations and changes may be made by others, and equivalents employed, without departing from the spirit of the present disclosure. Accordingly, it is expressly intended that all such variations, changes, and equivalents fall within the spirit and scope of the present disclosure as claimed.

The embodiments of the invention in which an exclusive property or privilege is claimed are defined as follows:

1. A pipe flange identification tool related through use to a pipe flange comprising at least a pair of adjacent flange bolts, the pipe flange identification tool comprising:
   a body;
   a first aperture through the body; and
   a second aperture through the body spaced apart from the first aperture,
   wherein a spacing between the first and second apertures matches a spacing between the pair of adjacent flange bolts;
   wherein a diameter of each of the first and second apertures is sized to receive at least a threaded portion of each of the pair or adjacent flange bolts;
   wherein the pipe flange identification tool bears information for identifying a flange relating to a relevant standard relating to the pipe flange.

2. The pipe flange identification tool of claim 1, wherein the flange is a portion of a valve, and the tool bears information for identifying the valve and a relevant standard for the valve.

3. The pipe flange identification tool of claim 1, wherein the body further comprises a head portion having the first and second apertures, and a handle portion.

4. The pipe flange identification tool of claim 3, wherein the body of the tool is elongate.

5. The pipe flange identification tool of claim 4, wherein the head portion is at or toward a first end of the body, and the handle portion is at or toward a second end of the body.

6. The pipe flange identification tool of claim 1, wherein the body comprises a lamina.

7. The pipe flange identification tool of claim 6, wherein the lamina is formed from a semi rigid material.

8. The pipe flange identification tool of claim 6, wherein the first and second apertures are positioned adjacent to an edge of the lamina.

9. The pipe flange identification tool of claim 8, wherein the body comprises a recess between the first and second apertures.

10. The pipe flange identification tool of claim 9, wherein the recess is formed into the portion of the edge of the lamina extending between the first and second apertures.

11. The pipe flange identification tool of claim 1, wherein the identifying information on the tool comprises information about the DN number of the flange and/or valve.

12. A set of pipe flange measurement tools comprising a plurality of the pipe flange identification tools of claim 1.

13. The set of claim 12, wherein each of the pipe flange identification tools in the set identifies a different flange from a common standard.

14. A kit comprising a plurality of the sets of claim 13.

15. The kit of claim 14, wherein each of the sets corresponds with a common standard.

16. The kit of claim 15, comprising a first set of tools for a first standard, and a second set of tools for a second standard.

17. The kit of claim 15, further comprising a case configured to enclose the sets of tools.

18. The set of claim 12, wherein each of the tools in a set is tethered together with a tether.

19. The pipe flange identification tool of claim 1, wherein the identifying information on the tool comprises a PCD of the flange bolts and the holes for the flange bolts.

20. The pipe flange identification tool of claim 1, wherein the identifying information on the tool comprises a hole diameter of the holes for the flange bolts.

21. The pipe flange identification tool of claim 1, wherein the identifying information on the tool comprises a number of the holes for the flange bolts.

22. A valve identification tool related through use to a valve pipe flange comprising at least a pair of adjacent flange bolts, the valve flange identification tool comprising:
   a body;
   a first aperture through the body; and
   a second aperture through the body spaced apart from the first aperture,
   wherein a spacing between the first and second apertures matches a spacing between the pair of adjacent flange bolts;

wherein a diameter of each of the first and second apertures is sized to receive at least a threaded portion of each of the pair or adjacent flange bolts;

wherein the valve identification tool bears information relating to a relevant standard for the valve.

* * * * *

UNITED STATES PATENT AND TRADEMARK OFFICE
CERTIFICATE OF CORRECTION

PATENT NO. : 10,935,358 B2
APPLICATION NO. : 16/112530
DATED : March 2, 2021
INVENTOR(S) : Z. Ilicic It is certified that error appears in the above-identified patent and that said Letters Patent is hereby corrected as shown below:

In the Claims

| Column | Line | |
|--------|------|---|
| 5 | 67 | In Claim 1, change "pair or" to --pair of-- |
| 7 | 3 | In Claim 22, change "pair or" to --pair of-- |

Signed and Sealed this
First Day of August, 2023

Katherine Kelly Vidal
*Director of the United States Patent and Trademark Office*